July 17, 1956     G. DIEMER ET AL     2,755,457
TUNING INDICATOR
Filed Dec. 22, 1954
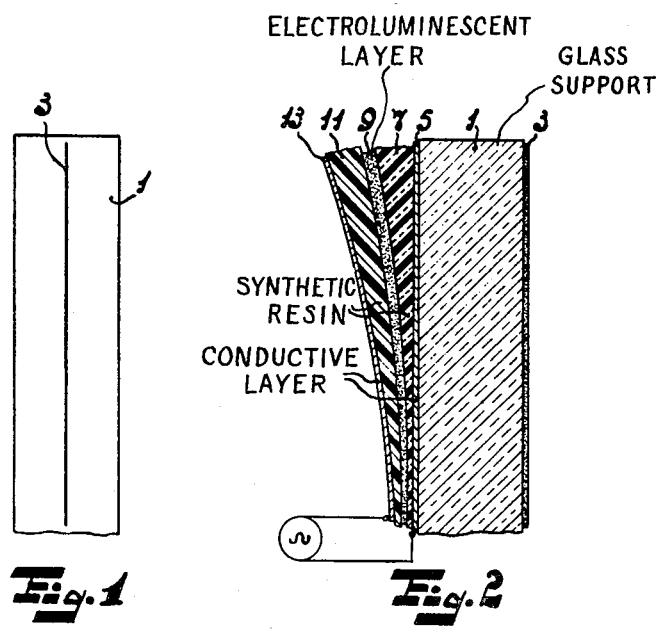
INVENTORS
GESINUS DIEMER
HENDRIK JACOBUS MARIA JOORMANN
BY
AGENT

United States Patent Office 2,755,457
Patented July 17, 1956

2,755,457

TUNING INDICATOR

Gesinus Diemer and Hendrik Jacobus Maria Joormann, Eindhoven, Netherlands, assignors to Hartford National Bank and Trust Company, Hartford, Conn., as trustee Application December 22, 1954, Serial No. 476,964

Claims priority, application Netherlands January 14, 1954

5 Claims. (Cl. 340—253)

This invention relates to an indicating device, and, in particular, to a tuning indicator for a radio receiver.

A tuning indicator for a radio receiver may comprise a luminescent member, in which the instantaneous size of the luminescent surface is an indication of the value of an electric voltage applied thereto.

The invention has as its object to provide an indicating device of the aforesaid kind by which a comparatively large luminescent surface and a distinct indication may be obtained, and in which the indicating member with the luminescent surface is arranged on the pointer of the tuning dial of a radio receiver, so that the indication of the tuned station and that of the correct tuning are visible at the same point. Such a construction, as will be appreciated, facilitates tuning of the receiver.

According to the invention, this is obtained by forming the luminescent member by a solid electroluminescent layer between two electrically conductive layers, the layer being rendered luminescent by an electrical alternating field in a manner well known to the art. The layer is further characterized by the fact that a particular physical quality of this layer system varys along at least part of the surface and at least in one direction in accordance with a continuous curve from a higher value to a lower value, this variation determining the amount or intensity of the light radiation produced.

The invention will now be described more fully with reference to the drawing in which:

Fig. 1 is a front view of one form of pointer for the tuning dial of a radio receiver;

Fig. 2 is a cross-sectional view through the center of the pointer illustrated in Fig. 1.

The pointer shown in Fig. 1 comprises a strip 1 of transparent material, for example, glass, on the front side of which a line 3 of opaque material, for example, lacquer, is provided. The pointer may be movable behind a transparent dial plate having station indications in the usual way; this plate may be of conventional construction; for the sake of simplicity it is not shown in the drawing.

Fig. 2 shows a lateral view of the pointer shown in Fig. 1, the horizontal dimension being greatly exaggerated for clarity. On the rear side of the strip of glass 1, there is provided a layer system comprising a transparent conductive layer 5, for example of tin oxide, having a very small thickness, for example of less than 3 $\mu$. The adjacent layer is of insulating clear synthetic resin 7, e. g. urea-formaldehyde resin having a thickness increasing from 5 to 40 $\mu$. Next follows an electro luminescent layer 9, for example, mainly zinc sulfide embedded in a suitable binder such as urea-formaldehyde resin of a thickness increasing from about 5 to about 20 $\mu$. This in turn is followed by a second insulating synthetic resin layer 11 similar to the layer 7 and a layer of good electric conductivity 13, for example, a silver layer. If a suitable alternating voltage, e. g. 50 v., is supplied to the layers 5 and 13, which serve as electrodes, the electroluminescent layer 9 becomes luminescent under the action of the alternating field occurring between the electrodes 5 and 13.

As is evident from Fig. 2, the distance between the electrodes 5 and 13 increases in the direction of length of the pointer 1 from bottom to top along a continuous curve, for example, from 15 to 100 $\mu$. At a certain value of the alternating voltage between the electrodes 5 and 13, the field strength at the top of the pointer, due to the greater space between the electrodes, is lower than at the bottom, and thus at a given value of the voltage the pointer will luminesce at the bottom and not at the top. If the votage varies, the size, i. e. length, of the luminescent surface will also vary. The voltage supplied to the electrodes 5 and 13 may be derived from an electronic tube generator, which is controlled by a voltage varying with the intensity of the incoming signal of the receiver. The size of the luminescent surface of the pointer then depends on the correctness of the tuning of the receiver.

The voltage supplied to the electrodes 5 and 13 may, as an alternative, be a direct voltage; in this case, the insulating layers 7 and 11 must be omitted.

In order to achieve the desired effect, it is essential that the sensitivity, i. e. the luminous output per unit of the voltage applied to the electrodes, along the surfaces of the layer system and in at least one direction should vary in accordance with a continuous function from a higher value to a lower value. This variation may in general be obtained by varying a physical quality of the layer system; in the aforedescribed case, the spacing between the electrodes varies. The non-constant electrode spacing may be obtained by means of a non-constant thickness of the layer 9 and/or of one of the layers 7 or 11 or of both of them.

As an alternative, all layers may have uniform thickness, but the concentration of the active component, in this case of the zinc sulfide grains in the electroluminescent layer, varies and decreases from the bottom to the top. As a further alternative, the phosphor layer may contain two active components, the activities of which are different, i. e. one of the two substances becomes more luminescent than the other at a materially higher field strength. If the concentration of the substance in the phosphor layer which luminesces at a low voltage is greater at the bottom of the pointer than at the top, while the concentration of the other component varies as a function of the spot along the pointer in a reverse direction, the desired effect is also obtained. Moreover, the two components may exhibit a difference in the color of the light radiated. Suitable components for this purpose are, for example, zinc sulphide with a small amount of copper sulfide added (green) and zinc sulphide with a small amount (1%) of manganese sulphide added (orange red).

As a further alternative, the alternating voltage may be supplied locally to at least one of the electrode layers, preferably only at one point, for example, to the lower end of the layer 5, and the resistance of the layer and the capacity between the two electrode layers may be so high that the two layers constitute for the alternating voltage applied, so to say, a filter composed of divided series resistance and divided parallel capacity. If, for example, the pointer is 1 cm. wide and about 8 cms. long and the tin oxide layer 5 is about 0.1 $\mu$ thick, the resistance of the layer may be of the order of 100,000 ohms. With an electrode distance of 50 $\mu$ the capacity per cm.$^2$ would be about 200 pf./cm$^2$. As a frequency of 10 kc./s. or more the voltage between the electrodes at the supply area, in this case at the lower end, is higher than at some distance from this area, in this case at the top, so that at the top luminescence occurs only at a higher voltage. In order to amplify the effect, the device may be such that at an increase in voltage the frequency decreases.

In a preferred embodiment of the pointer, the spacing between the electrodes is at a maximum approximately in the center of the pointer and at a maximum at the two extremities. Thus, two luminescent surfaces of varying sizes are obtained at the ends and an intermediate dark surface which facilitates the observation of the variation.

Of course, combinations of the measures described above are also possible.

Thus, while we have described our invention in connection with specific embodiments and applications, other modifications thereof will be readily apparent to those skilled in this art without departing from the spirit and scope of the invention as defined in the appended claims.

What is claimed is:

1. An indicating device comprising a pair of electrically-conductive layers and an electroluminescent layer therebetween, said layers having a physical property which varies along the length of the layers, whereby the size of the luminescing portion of the layers depends upon the magnitude of an applied voltage.

2. An indicating device comprising a pair of electrically-conductive layers and an electroluminescent layer therebetween, the spacing between the conductive layers gradually varying along the layers, whereby the size of the luminescing portion of the device depends upon the magnitude of an applied voltage.

3. An indicating device comprising a pair of electrically-conductive layers and an electroluminescent layer therebetween, the concentration of the active component of the electroluminescent layer gradually varying along the layer, whereby the size of the luminescing portion of the device depends upon the magnitude of an applied voltage.

4. An indicating device comprising a pair of electrically-conductive layers and an electroluminescent layer therebetween, the electroluminescent layer containing two components of different activity each radiating light in a different color, the concentration of the two components varying as a function of the location of the two components and in the opposite sense, whereby the size of the luminescing portion of the device depends upon the magnitude of an applied voltage.

5. An indicating device comprising a pair of electrically-conductive layers and an electroluminescent layer therebetween, means for applying an alternating potential to at least one of the conductive layers at one point, the resistance of the electroluminescent layer and the capacity between the conductive layers at said one point having values at which the field strength at said one point due to said alternating potential exceeds the level required for producing luminescence, and the resistance of the electroluminescent layer and the capacity between the conductive layers at points spaced from said one point are such that said alternating potential cannot produce luminescence thereat, whereby the size of the luminescing portion is voltage-dependent.

References Cited in the file of this patent

UNITED STATES PATENTS

| | | |
|---|---|---|
| Re. 11,498 | Fiske | June 4, 1895 |
| 1,059,095 | Whitehead | Apr. 15, 1913 |
| 2,081,767 | Richter | May 25, 1937 |
| 2,462,781 | Schoenbaum | Feb. 22, 1949 |